(12) United States Patent
Liu et al.

(10) Patent No.: US 11,777,768 B2
(45) Date of Patent: Oct. 3, 2023

(54) PRE-EQUALIZATION COMPENSATION METHOD AND DEVICE FOR LINK, STORAGE MEDIUM AND ELECTRONIC DEVICE

(71) Applicant: ZTE CORPORATION, Guangdong (CN)

(72) Inventors: Tan Liu, Guangdong (CN); Feng Zhao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 11 days.

(21) Appl. No.: 17/637,892

(22) PCT Filed: Nov. 20, 2020

(86) PCT No.: PCT/CN2020/130428
§ 371 (c)(1),
(2) Date: Feb. 24, 2022

(87) PCT Pub. No.: WO2021/098825
PCT Pub. Date: May 27, 2021

(65) Prior Publication Data
US 2022/0286328 A1 Sep. 8, 2022

(30) Foreign Application Priority Data
Nov. 22, 2019 (CN) .......................... 201911158565.1

(51) Int. Cl.
*H04L 25/03* (2006.01)
*H04L 25/10* (2006.01)
*H04L 27/01* (2006.01)

(52) U.S. Cl.
CPC ........ *H04L 25/03159* (2013.01); *H04L 25/10* (2013.01); *H04L 27/01* (2013.01)

(58) Field of Classification Search
CPC .................................................. H04L 25/03159
(Continued)

(56) References Cited

U.S. PATENT DOCUMENTS

| 2002/0027958 A1 | 3/2002 | Kolanek |
| 2003/0063660 A1 | 4/2003 | Shenoi et al. |

(Continued)

FOREIGN PATENT DOCUMENTS

| CN | 1352511 A | 6/2002 |
| CN | 1529521 A | 9/2004 |

(Continued)

OTHER PUBLICATIONS

WIPO, International Search Report dated Jan. 19, 2021.
(Continued)

*Primary Examiner* — Lihong Yu
(74) *Attorney, Agent, or Firm* — Li & Cai Intellectual Property (USA) Office (57) ABSTRACT

The present disclosure provides a pre-equalization compensation method and device for a link, a storage medium and an electronic device. The method includes: in response to that an Active Antenna Unit (AAU) is powered on, parsing a prestored off-line compensation table to obtain first non-flatness equalization coefficients of an RF link with a plurality of sub-carriers and second non-flatness equalization coefficients of a wave control link with the plurality of sub-carriers, with each one of the plurality of sub-carriers corresponding to one of the first non-flatness equalization coefficients and one of the second non-flatness equalization coefficients; combining the first non-flatness equalization coefficients of the plurality of sub-carriers and the second non-flatness equalization coefficients of the plurality of sub-carriers to obtain a combined carrier non-flatness coefficient; and performing equalization compensation on the
(Continued)

link according to the combined carrier non-flatness coefficient.

13 Claims, 5 Drawing Sheets (58) Field of Classification Search
USPC .......................................................... 375/229
See application file for complete search history.

(56) References Cited

U.S. PATENT DOCUMENTS

| | | | | |
|---|---|---|---|---|
| 2003/0153273 | A1* | 8/2003 | Ebert ..................... | H04L 1/0001 |
| | | | | 455/67.14 |
| 2003/0228845 | A1 | 12/2003 | Peng et al. | |
| 2004/0157646 | A1 | 8/2004 | Raleigh et al. | |
| 2010/0019724 | A1 | 1/2010 | Mizutani et al. | |
| 2011/0197071 | A1* | 8/2011 | Wolcott ................. | H04L 25/03 |
| | | | | 713/176 |
| 2017/0227653 | A1 | 8/2017 | Carrie et al. | |
| 2019/0173713 | A1* | 6/2019 | Liu ...................... | H04L 27/2646 |
| 2019/0356527 | A1* | 11/2019 | Xu ....................... | H04B 14/008 |

FOREIGN PATENT DOCUMENTS

| | | |
|---|---|---|
| CN | 105099970 A | 11/2015 |
| CN | 107276701 A | 10/2017 |
| JP | 2016134840 A | 7/2016 |
| JP | 2020526943 A | 8/2020 |

OTHER PUBLICATIONS

Japan Patent Office, First Office Action dated Mar. 22, 2023, for corresponding JP application No. 2022-520297.
Hyoung Joon Part, et al. "Distortion Mitigation in Multiband OFDM RoF Transmission Employing Blind Post qualizer," IEEE Photonics Technology Letters dated Dec. 1, 2016.
China Patent Office, First office action dated Jul. 28, 2023, for corresponding CN application No. 201911158565.1.
Japan Patent Office, Office action dated Jul. 28, 2023 regarding Japan Patent Application No. 2022-520297.

* cited by examiner

PRE-EQUALIZATION COMPENSATION METHOD AND DEVICE FOR LINK, STORAGE MEDIUM AND ELECTRONIC DEVICE

CROSS-REFERENCE TO RELATED APPLICATION

The present application claims priority from the Chinese patent application No. 201911158565.1 filed with the China Patent Office on Nov. 22, 3019, the entire contents of which are incorporated in the present application by reference.

TECHNICAL FIELD

The present disclosure relates to the field of wireless communications, and in particular, to a pre-equalization compensation method and device for a link, a storage medium and an electronic device.

BACKGROUND

With the development of 5G network technologies, by adopting a high band, a wider spectrum and air interface technology, bandwidth requirements of 5G base stations are greatly increased, and are expected to be more than 10 times of those of Long-Term Evolution (LTE). As an indispensable component of a wireless communication network, a base station is mainly composed of a Centralized Unit (CU), a Distributed Unit (DU) and an Active Antenna Unit (AAU). Meanwhile, the form of the AAU is also developing towards multi-carrier and ultra-wideband for meeting the higher requirements of adaptability proposed by customers to the AAU. However, since a frequency band supported by the multi-carrier and ultra-wideband AUU is wide, the frequency spacing between carriers on the frequency band becomes larger and larger, which makes the flatness problems within a carrier or between carriers in a link more and more prominent.

According to a conventional solution, the flatness problem between carriers in a link in a Radio Remote Unit (RRU) is mainly solved through static compensation performed by an equalization circuit at a Radio Frequency (RF) link side or by using a high-order filter circuit in an intermediate frequency link. Although the equalization circuit has certain effect on non-flatness of linear increasing or linear decreasing, the equalization circuit has limited capability to compensate for large-bandwidth irregular non-flatness, and the compensation accuracy of the equalization circuit is also limited. Therefore, the equalization circuit cannot solve the problem of non-flatness in a link in 5G ultra-wideband scenes.

No effective technical solution has been put forward for the problem of non-flatness in a link in 5G ultra-wideband scenes in the existing art.

SUMMARY

Embodiments of the present disclosure provide a pre-equalization compensation method and device for a link, a storage medium and an electronic device, so as to at least solve the problem of non-flatness in a link in 5G ultra-wideband scenes in the existing art.

An embodiment of the present disclosure provides a pre-equalization compensation method for a link, including: in response to that an Active Antenna Unit (AAU) is powered on, parsing a prestored off-line compensation table to obtain first non-flatness equalization coefficients of an Radio Frequency (RF) link with a plurality of sub-carriers and second non-flatness equalization coefficients of a wave control link with the plurality of sub-carriers, with each one of the plurality of sub-carriers corresponding to one of the first non-flatness equalization coefficients and one of the second non-flatness equalization coefficients; combining the first non-flatness equalization coefficients of the plurality of sub-carriers and the second non-flatness equalization coefficients of the plurality of sub-carriers to obtain a combined carrier non-flatness coefficient; and performing equalization compensation on the link according to the combined carrier non-flatness coefficient, with the equalization compensation used for improving signal flatness in the whole link.

Another embodiment of the present disclosure further provides a pre-equalization compensation device for a link, including: a parsing unit configured to, in response to that an Active Antenna Unit (AAU) is powered on, parse a prestored off-line compensation table to obtain a plurality of first non-flatness equalization coefficients of an Radio Frequency (RF) link with sub-carriers and a plurality of second non-flatness equalization coefficients of a wave control link with the sub-carriers, with each sub-carrier corresponding to one of the first non-flatness equalization coefficients and one of the second non-flatness equalization coefficients; a combining unit configured to combine the plurality of first non-flatness equalization coefficients and the plurality of second non-flatness equalization coefficients to obtain a combined carrier non-flatness coefficient; and a processing unit configured to perform equalization compensation on the link according to the combined carrier non-flatness coefficient, with the equalization compensation used for improving signal flatness in the whole link.

Still another embodiment of the present disclosure further provides a computer-readable storage medium having programs stored therein, and the programs, when executed by a processor, implement the pre-equalization compensation method for the link described above.

Yet another embodiment of the present disclosure further provides an electronic device, including a processor and a memory, the memory has programs stored therein, and the programs, when executed by the processor, implement the pre-equalization compensation method for the link described above.

BRIEF DESCRIPTION OF DRAWINGS

The drawings described herein are used for further understanding of the present disclosure and are incorporated in and constitute a part of the present disclosure. The exemplary embodiments and their descriptions of the present disclosure are intended to explain the present disclosure but do not make improper limitation to the present disclosure. In the drawings.

DETAIL DESCRIPTION OF EMBODIMENTS

The present disclosure will be described in detail below with reference to the accompanying drawings in conjunction with embodiments. It should be noted that the embodiments and features in the embodiments of the present disclosure may be combined with each other if no conflict incurs.

It should be noted that the terms "first", "second" and the like in the description, claims and drawings of the present disclosure are used for distinguishing between similar objects, but not necessarily for describing a particular order or chronological order.

Figure 1:
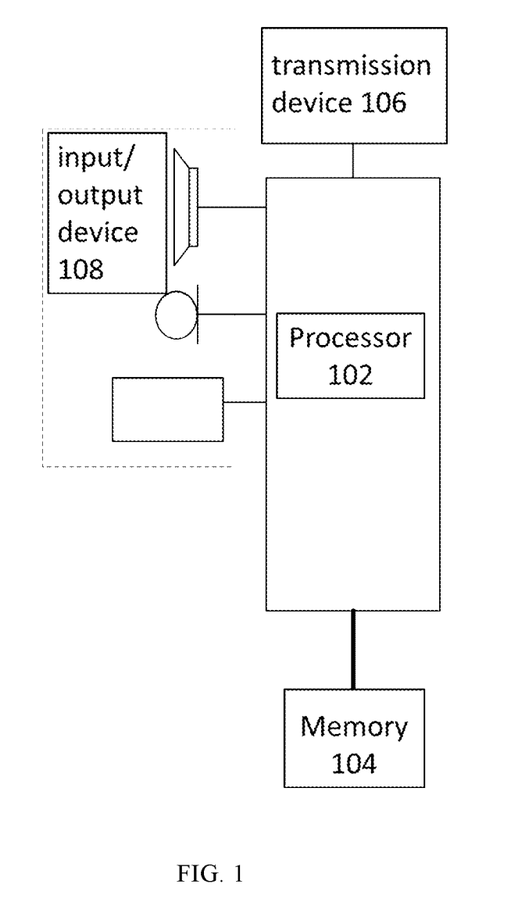
FIG. 1 is a block diagram of a hardware structure of a terminal where a pre-equalization compensation method for a link is performed according to an embodiment of the present disclosure.

The method provided in the embodiment of the present disclosure may be performed in a terminal, a computer terminal, a base station or a similar computing device. A case where the method is performed in a terminal is taken as an example. FIG. 1 is a block diagram of a hardware structure of a terminal where a pre-equalization compensation method for a link is performed according to an embodiment of the present disclosure. As shown in FIG. 1, a terminal 10 may include one or more processors 102 (merely one processor is shown in FIG. 1, and the processor 102 may include, but is not limited to, processing device such as a microprocessor (e.g., a microcontroller unit (MCU)) or a programmable logic device (e.g., a field programmable gate array (FPGA)) .), and a memory 104 configured to store data. In some implementations, the terminal may further include a transmission device 106 for communication functions and an input/output device 108. It should be understood by those of ordinary skill in the art that the structure shown in FIG. 1 is only for illustration and is not intended to limit the structure of the above terminal. For example, the terminal 10 may include more or fewer components than those shown in FIG. 1, or may have different configurations capable of performing equivalent functions as the terminal shown in FIG. 1 or performing more functions than the terminal shown in FIG. 1.

The memory 104 may be configured to store computer programs, such as software programs and modules of application software. For example, the memory 104 may be configured to store computer programs corresponding to the pre-equalization compensation method provided in the embodiment of the present disclosure. By executing the computer programs stored in the memory 104, the processor 102 performs various functional applications and data processing, that is, implementing the pre-equalization compensation method. The memory 104 may include a high-speed random access memory, and may also include a non-volatile memory, such as one or more magnetic storage devices, flash memories, or other non-volatile solid-state memories. In some examples, the memory 104 may further include a memory remotely arranged relative to the processor 102, and the remote memory may be connected to the terminal 10 via a network. The examples of the above network include, but are not limited to, the Internet, an intranet, a local area network, a mobile communication network, and the combinations thereof.

The transmission device 106 is configured to receive or transmit data via a network. The specific examples of the network may include a wireless network provided by a communication provider of the terminal 10. In an example, the transmission device 106 includes a Network Interface Controller (NIC) that may be connected to other network devices via a base station so as to communicate with the Internet. In another example, the transmission device 106 may be an RF module that is configured to communicate with the Internet in a wireless manner.

Figure 2:
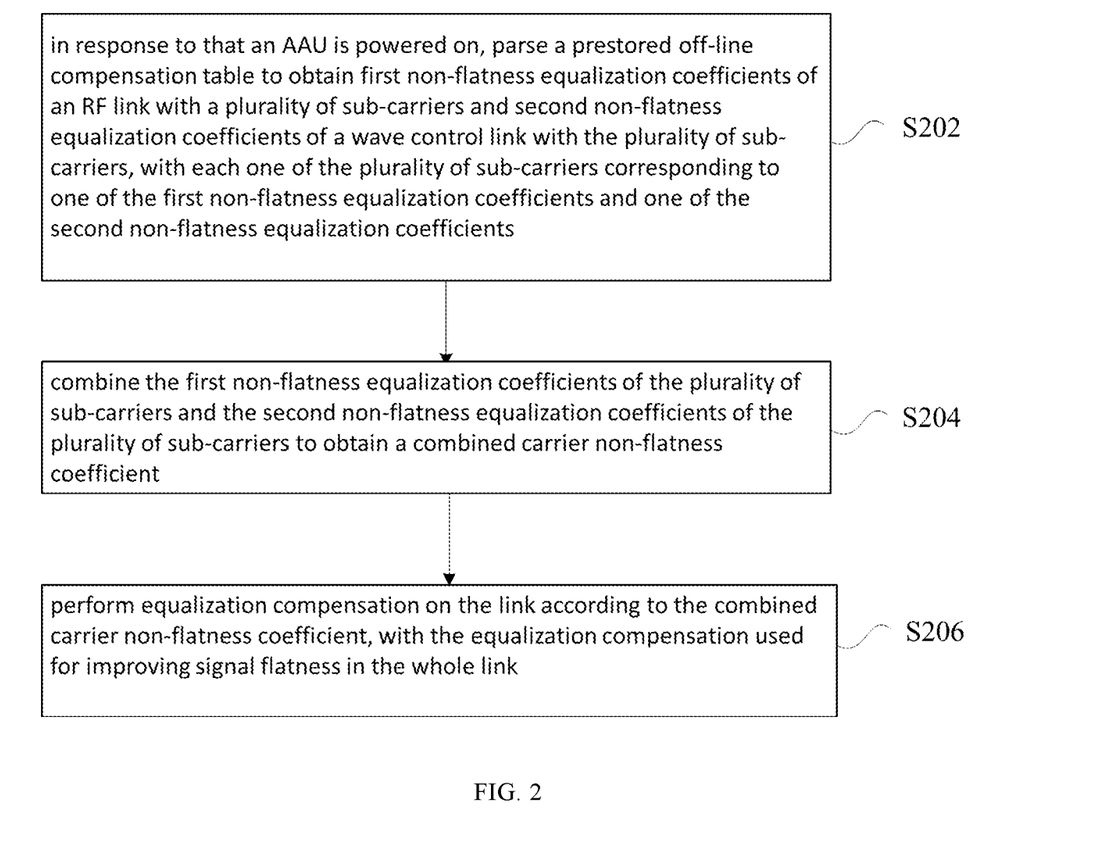
FIG. 2 is a flowchart illustrating an exemplary pre-equalization compensation method for a link according to an embodiment of the present disclosure.

The embodiment of the present disclosure provides a pre-equalization compensation method for a link performed in the terminal shown in FIG. 1. FIG. 2 is a flowchart illustrating an exemplary pre-equalization compensation method for a link according to an embodiment of the present disclosure. As shown in FIG. 2, the method includes:

operation S202, in response to that an AAU is powered on, parsing a prestored off-line compensation table to obtain first non-flatness equalization coefficients of an RF link with a plurality of sub-carriers and second non-flatness equalization coefficients of a wave control link with the plurality of sub-carriers, with each one of the plurality of sub-carriers corresponding to one of the first non-flatness equalization coefficients and one of the second non-flatness equalization coefficients;

operation S204, combining the first non-flatness equalization coefficients of the plurality of sub-carriers and the second non-flatness equalization coefficients of the plurality of sub-carriers to obtain a combined carrier non-flatness coefficient; and operation S206, performing equalization compensation on the link according to the combined carrier non-flatness coefficient, with the equalization compensation used for improving signal flatness in the whole link.

According to the present disclosure, in response to that the AAU is powered on, the prestored off-line compensation table is parsed to obtain the first non-flatness equalization coefficients of the RF link with the plurality of sub-carriers and the second non-flatness equalization coefficients of the wave control link with the plurality of sub-carriers, with each one of the plurality of sub-carriers corresponding to one of the first non-flatness equalization coefficients and one of the second non-flatness equalization coefficients; the first non-flatness equalization coefficients of the plurality of sub-carriers are combined with the second non-flatness equalization coefficients of the plurality of sub-carriers to obtain the combined carrier non-flatness coefficient; and equalization compensation is performed on the link according to the combined carrier non-flatness coefficient, with the equalization compensation used for improving the signal flatness in the whole link. The above technical solution solves the problem of non-flatness in a link in 5G ultra-wideband scenes in the existing technology. According to the above technical solution, the link is subjected to equalization compensation according to the combined carrier non-flatness coefficient, so that a technical effect of improving the signal flatness in the whole link can be achieved.

In some implementations, before the operation S202, the method further includes: obtaining the first non-flatness equalization coefficients of the RF link with the plurality of sub-carriers by at least one of a signal source or a spectrometer, and obtaining the second non-flatness equalization coefficients of the wave control link with the plurality of sub-carriers by at least one of a vector network analyzer or a scanner probe; and generating the off-line compensation table according to the first non-flatness equalization coefficients and the second non-flatness equalization coefficients of the plurality of sub-carriers.

In some implementations, the operation S204 of combining the first non-flatness equalization coefficients of the plurality of sub-carriers and the second non-flatness equalization coefficients of the plurality of sub-carriers to obtain a combined carrier non-flatness coefficient may include: combining the first non-flatness equalization coefficient and the second non-flatness equalization coefficient of any one of the sub-carriers to obtain a non-flatness coefficient of the any one of the sub-carriers; and combining non-flatness coefficients of the plurality of sub-carriers to obtain the combined carrier non-flatness coefficient.

The combining the first non-flatness equalization coefficient and the second non-flatness equalization coefficient of any one of the sub-carriers to obtain a non-flatness coefficient of the any one of the sub-carriers may include: determining a non-flatness coefficient of an effective sub-carrier corresponding to the any one of the sub-carriers in the link through linear interpolation with a frequency point and/or temperature information of the any one of the sub-carriers in the link taken as an index; and combining the non-flatness coefficient of the effective sub-carrier and the first non-flatness equalization coefficient and the second non-flatness equalization coefficient of the any one of the sub-carriers to obtain the non-flatness coefficient of the any one of the sub-carriers in a frequency band.

The operation S206 of performing equalization compensation on the link according to the combined carrier non-flatness coefficient may include: obtaining a combined carrier pre-equalization compensation coefficient and a combined carrier pre-equalization compensation factor according to the combined carrier non-flatness coefficient; and performing pre-equalization compensation on the link according to the combined carrier pre-equalization compensation coefficient and the combined carrier pre-equalization compensation factor.

In some implementations, the obtaining a combined carrier pre-equalization compensation coefficient and a combined carrier pre-equalization compensation factor according to the combined carrier non-flatness coefficient includes: subjecting the combined carrier non-flatness coefficient to normalization to obtain the combined carrier pre-equalization compensation coefficient and the combined carrier pre-equalization compensation factor.

In some implementation, the performing pre-equalization compensation on the link according to the combined carrier pre-equalization compensation coefficient and the combined carrier pre-equalization compensation factor includes: performing frequency domain processing in each sub-carrier in the link according to the combined carrier pre-equalization compensation coefficient and the combined carrier pre-equalization compensation factor to perform equalization compensation on the link.

The pre-equalization compensation process for the link is illustrated below by an example, but the technical solution of the embodiment of the present disclosure is not limited thereto. The technical solution of the example of the present disclosure is as follows.

Figure 3:
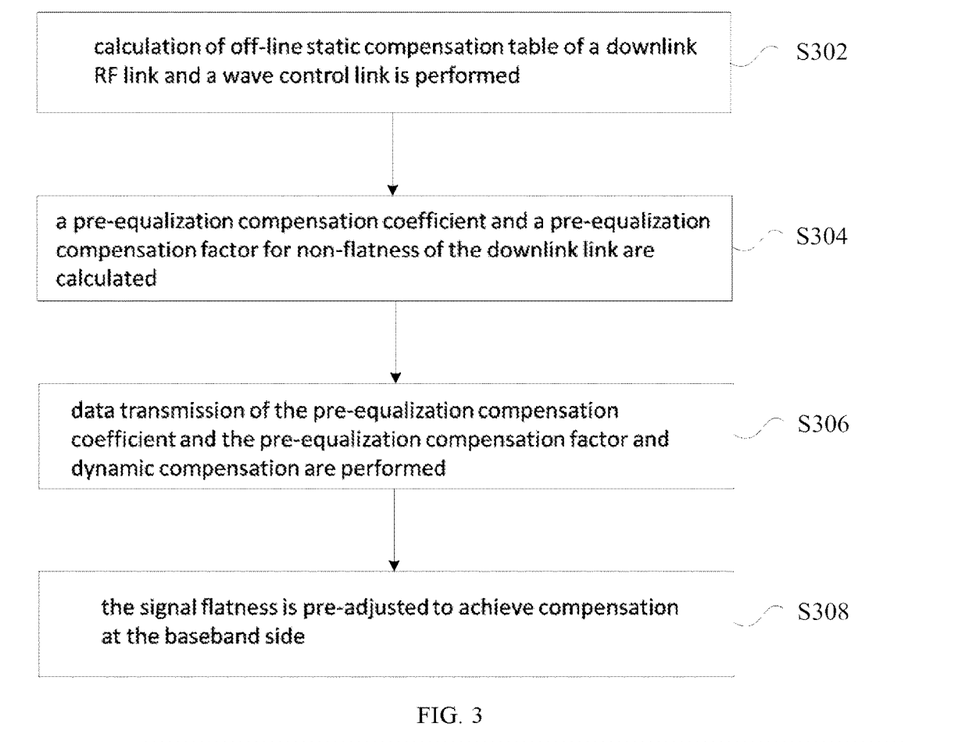
FIG. 3 is a flowchart illustrating an exemplary pre-equalization compensation method for signal flatness of a link in an ultra-wideband AAU according to an exemplary embodiment of the present disclosure.

As shown in FIG. 3, the present disclosure provides a pre-equalization compensation method for signal flatness of a link in an ultra-wideband AAU, and the method includes the following operations S302, S304, S306 and S308.

At the operation S302, calculation of off-line static compensation table of an RF link (e.g., a downlink RF link) and a wave control link is performed (for example, a compensation table is generated).

The difference of flatness between carriers in a data link (such as a downlink data link) is mainly caused by the characteristics of RF devices of the RF link and the wave control link in a wider spectrum range, and thus an off-line compensation table of the RF link and the wave control link is generated in advance by collecting flatness characteristic parameters (equivalent to the second flatness equalization coefficients) of the devices in the wave control link in advance through a vector network analyzer and a scanner probe (e.g., a horn antenna), and collecting flatness characteristic parameters (equivalent to the first flatness equalization coefficients) of the RF link in advance through a signal source and a spectrometer. After a cell is established on the AAU, a compensation coefficient of each effective sub-carrier may be obtained by reading the pre-generated off-line compensation table and applying a flatness compensation algorithm according to the actual power of each carrier.

In some implementations, the collection of the flatness characteristic parameters of the wave control link may be performed on main devices in the link, such as a shaped chip and a power splitter.

The off-line compensation table may be stored in a non-volatile memory of the AAU in the form of ordinary text file or in other storage formats. In some implementations, the off-line compensation table may be stored in a flash of a mainframe of the AAU.

A sampling step of the characteristic parameters may be flexibly selected according to the actual characteristics of the devices. Frequency point zones between sampling points may be fitted by a fitting algorithm to ensure that data may be sampled in the whole bandwidth. In some implementations, the fitting of frequency point characteristics may adopt a linear fitting algorithm.

At the operation S304, a pre-equalization compensation coefficient and a pre-equalization compensation factor for non-flatness of the link (e.g., the downlink link) are calculated.

After the framework of the AAU is powered on, the characteristic parameter table file of the RF link and the wave control link prestored in the flash is read and parsed, and a non-flatness equalization coefficient of an effective sub-carrier number corresponding to the RF link and the wave control link at a corresponding bandwidth is obtained by performing linear interpolation according to a step between effective sub-carriers, with a frequency point and temperature information of the sub-carriers in the link taken as indexes; and the frequency-domain non-flatness equalization coefficients of the sub-carriers in the RF link and the wave control link are combined by directly adding decibels (dBs) to obtain non-flatness values of all the carrier frequencies in the link (since the sampling points of cavity flatness are not continuous, linear fitting is carried out according to actual conditions if the frequency point taken as an index falls between two sampling points).

For each antenna, a combined carrier non-flatness coefficient for final compensation is calculated according to an obtained sub-carrier non-flatness coefficient, then the combined carrier non-flatness coefficient is converted into a linear value, a reciprocal is taken, and a power average value of pre-equalization coefficients is calculated, normalization is performed to obtain a pre-equalization compensation coefficient, and a logarithm is taken according to the maximum value of the pre-equalization coefficients to obtain a pre-equalization compensation factor so as to prevent frequency domain saturation. The pre-equalization coefficients may be understood as a set of values, and the set of values vary with the bandwidths of the sub-carriers and the number of the sub-carriers, for example, pre-equalization coefficients of double carriers with a bandwidth of 400M may include more than 6000 values, and the pre-equalization compensation factor may be a numerical value such as 0, 1 or 2. However, the above example is merely for illustration, rather than making any limitation herein.

At the operation S306, data transmission of the pre-equalization compensation coefficient and the pre-equalization compensation factor and dynamic compensation are performed.

An expected equalization compensation coefficient and an expected equalization compensation factor for each sub-carrier are extracted from the calculated combined carrier pre-equalization compensation coefficient and the calculated combined carrier pre-equalization compensation factor of the link, and are sent to a baseband unit (BBU) for frequency domain processing through an XC interface/CPRI interface/eCPRI interface. Pre-equalization compensation is carried out each time the AAU performs frequency switching, thereby ensuring the signal flatness in the whole bandwidth.

At the operation S308, the signal flatness is pre-adjusted to achieve compensation at the baseband side.

After receiving the expected equalization compensation coefficient and the expected equalization compensation factor of the carrier, the BBU adjusts the flatness of the carrier by performing frequency domain multiplication and K-value scaling in the effective sub-carrier in a frequency domain according to the expected equalization compensation coefficient and the expected equalization compensation factor of the carrier. This solution separates flatness equalization from calibration compensation, does not need a complex equalization circuit, can be easily implemented, and reduces system complexity.

According to the solution provided in the embodiment, fine pre-equalization compensation of the link in the AAU is improved, the effect of improving the signal flatness of the link is achieved, RF equalization devices are saved, and RF performance of the system and Radio capability of the AAU are improved.

Figure 4:
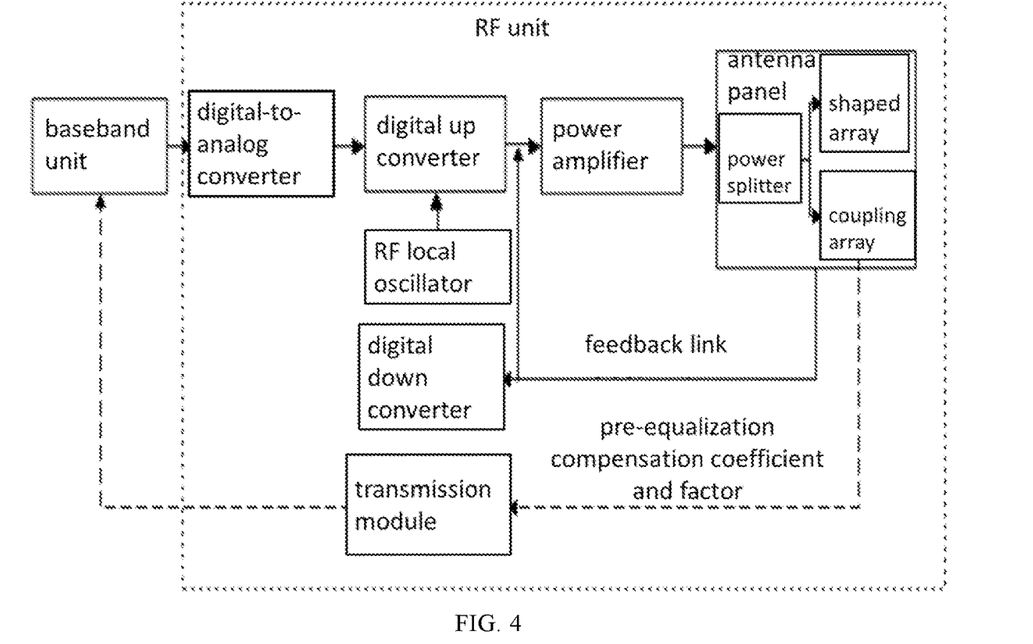
FIG. 4 is a block diagram of an exemplary pre-equalization compensation device for signal flatness of a link in an AAU according to an embodiment of the present disclosure.

It should be noted that, as shown in FIG. 4, the pre-equalization compensation method for signal flatness of a link in an ultra-wideband AAU can be applied to a pre-equalization compensation device for signal flatness of a link in an ultra-wideband AAU. The device includes: a BBU, a digital-to-analog converter, a digital up converter, a power amplifier, an RF local oscillator, a digital down converter, a wave control board (the antenna panel in FIG. 4) and a transmission module, and the wave control board includes a power splitter, a shaped array and a coupling array, and is connected to the digital down converter and the power amplifier through a feedback link.

The pre-equalization compensation process for the link is illustrated below by another example, but the technical solution of the embodiment of the present disclosure is not limited thereto. The technical solution of the example of the present disclosure is as follows.

At the first operation, an off-line static compensation table of an RF link and an antenna panel is generated.

In a full frequency band supported by an RF link of an ultra-wideband AAU, flatness characteristics of the RF link are subjected to practical scanning through a signal source and a spectrometer by taking a step of 20M, so as to generate a mapping relationship table of full-bandwidth scanning frequency points and flatness of the RF link, and the mapping relationship table is taken as characteristic parameters of the RF link and is written in text form in a flash in a mainframe where an RF board is located.

Figure 5:
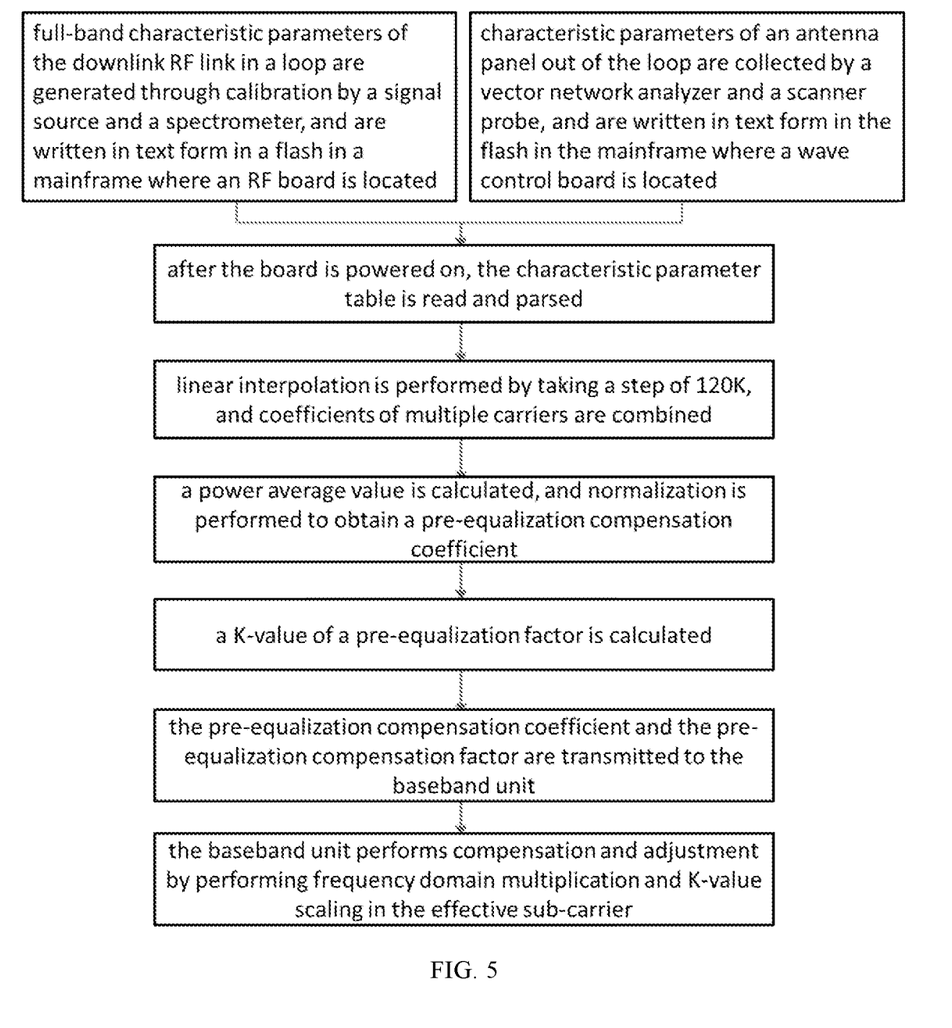
FIG. 5 is a schematic diagram of an exemplary pre-equalization compensation process according to an embodiment of the present disclosure.

As shown in FIG. 4, a wave control link in the AAU does not have a feedback channel, and RF device characteristics of the link in a relatively wide frequency spectrum range may also lead to a difference in flatness between carriers. Therefore, flatness characteristic parameters of the devices are collected in advance through a vector network analyzer and a scanner probe (e.g., a horn antenna) in a way as shown in FIG. 5 to generate the characteristic parameters of the wave control link, and the characteristic parameters of the wave control link are written in the flash in the mainframe where the wave control board is located.

At the second operation, a pre-equalization compensation coefficient and a pre-equalization compensation factor for non-flatness of the link are calculated.

After the framework of the AAU is powered on, the characteristic parameter table file of the RF link and the wave control link prestored in the flash is read and parsed, and a non-flatness coefficient of an effective sub-carrier number (taking a single carrier at a bandwidth of 400M as an example, and the bandwidth of 400M is corresponding to 3168 effective sub-carriers) corresponding to a corresponding bandwidth is obtained by performing linear interpolation according a step of 120K between 5G high-frequency effective sub-carriers, with a frequency point and temperature information of the carriers in the link taken as indexes; and the frequency-domain non-flatness equalization coefficients of the sub-carriers in the RF link and the wave control link are combined by directly adding dBs to obtain non-flatness values of all the carrier frequencies in the link.

For each antenna, a combined carrier non-flatness coefficient for final compensation is calculated according to an obtained sub-carrier non-flatness coefficient, then the combined carrier non-flatness coefficient is converted into a linear value, a reciprocal is taken, and a power average value of pre-equalization coefficients is calculated, normalization is performed to obtain a pre-equalization compensation coefficient, and a logarithm is taken according to the maximum value of the pre-equalization coefficients to obtain a pre-equalization compensation factor so as to prevent frequency domain saturation.

At the third operation, data transmission of the pre-equalization compensation coefficient and the pre-equalization compensation factor and dynamic compensation are performed.

An expected equalization compensation coefficient and an expected equalization compensation factor for each sub-carrier are extracted from the calculated combined carrier pre-equalization compensation coefficient and the calculated combined carrier pre-equalization compensation factor of the link (if the sub-carrier is a low carrier, the expected equalization compensation coefficients and the expected equalization compensation factors of the first 3168 effective sub-carriers are extracted; and if the sub-carrier is a high carrier, the expected equalization compensation coefficients and the expected equalization compensation factors of the last 3168 effective sub-carriers are extracted). In a baseband service uplink scenario, the expected equalization compensation coefficient and the expected equalization compensation factor are transmitted to a frequency domain of a BBU of the AAU through an XC interface; and in a scenario except for the baseband service uplink scenario, the expected equalization compensation coefficient and the expected equalization compensation factor are transmitted to the frequency domain of the BBU through a CPRI/eCPPRI interface. Pre-equalization compensation is carried out each time the AAU switches a frequency point of a cell, thereby ensuring the signal flatness in the whole bandwidth.

At the fourth operation, the signal flatness is pre-adjusted to achieve compensation at the baseband side.

After receiving the expected equalization compensation coefficient and the expected equalization compensation factor of the carrier, the baseband unit adjusts the flatness of the carrier by performing frequency domain multiplication and K-value scaling in the effective sub-carrier in a frequency domain according to the expected equalization compensation coefficient and the expected equalization compensation factor of the carrier.

To sum up, the above solution separates flatness equalization from calibration compensation, does not need a complex equalization circuit, can be easily implemented, and reduces system complexity.

Through the above description of the embodiment, those of ordinary skill in the art would understand clearly that the method according to the above embodiment may be implemented by software together with a necessary general-purpose hardware platform, and may also be implemented by hardware. Based on such understanding, a part of the technical solution of the present disclosure which contributes may be implemented in the form of a software product, and the software product is stored in a storage medium (such as a Read-Only Memory (ROM)/Random Access Memory (RAM), a magnetic disk and an optical disc) and includes several instructions configured to enable a terminal device (which may be a mobile phone, a computer, a server, or a network device, etc.) to perform the method according to the embodiment of the present disclosure.

An embodiment of the present disclosure further provides a pre-equalization compensation device for a link, which is configured to implement the method in the above embodiment, and what is illustrated above is not repeated here. The term "module" used below refers to software, hardware, or a combination of software and hardware that can perform predetermined functions. Although the device described in the following embodiment is implemented by software, the implementations of the device by hardware or a combination of software and hardware are possible and can be conceived.

Figure 6:
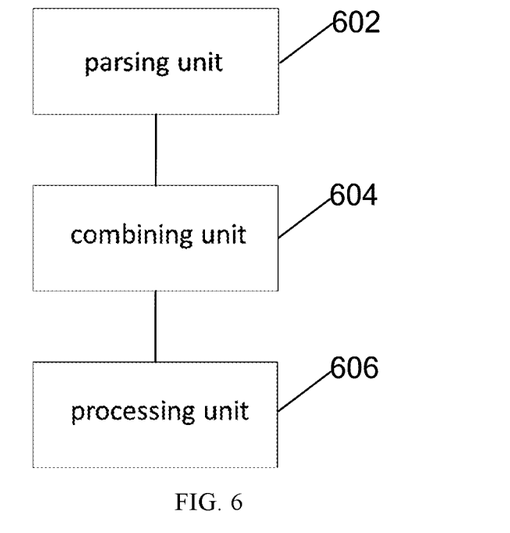
FIG. 6 is a block diagram of an exemplary pre-equalization compensation device for a link according to an embodiment of the present disclosure.

FIG. 6 is a block diagram of an exemplary pre-equalization compensation device for a link according to an embodiment of the present disclosure. As shown in FIG. 6, the device includes:

a parsing unit 602 configured to, in response to that an AAU is powered on, parse a prestored off-line compensation table to obtain first non-flatness equalization coefficients of an RF link with a plurality of sub-carriers and second non-flatness equalization coefficients of a wave control link with the plurality of sub-carriers, with each one of the plurality of sub-carriers corresponding to one of the first non-flatness equalization coefficients and one of the second non-flatness equalization coefficients;

a combining unit 604 configured to combine the first non-flatness equalization coefficients of the plurality of sub-carriers and the second non-flatness equalization coefficients of the plurality of sub-carriers to obtain a combined carrier non-flatness coefficient; and a processing unit 606 configured to perform equalization compensation on the link according to the combined carrier non-flatness coefficient, with the equalization compensation used for improving signal flatness in the whole link.

According to the present disclosure, in response to that the AAU is powered on, the prestored off-line compensation table is parsed to obtain the first non-flatness equalization coefficients of the RF link with the plurality of sub-carriers and the second non-flatness equalization coefficients of the wave control link with the plurality of sub-carriers, with each one of the plurality of sub-carriers corresponding to one of the first non-flatness equalization coefficients and one of the second non-flatness equalization coefficients; the first non-flatness equalization coefficients of the plurality of sub-carriers are combined with the second non-flatness equalization coefficients of the plurality of sub-carriers to obtain the combined carrier non-flatness coefficient; and equalization compensation is performed on the link according to the combined carrier non-flatness coefficient, with the equalization compensation used for improving the signal flatness in the whole link. The above technical solution solves the problem of non-flatness in a link in 5G ultra-wideband scenes in the existing technology. According to the above technical solution, the link is subjected to equalization compensation according to the combined carrier non-flatness coefficient, so that a technical effect of improving the signal flatness in the whole link can be achieved.

In some implementations, the combining unit includes: a first combining module configured to combine the first non-flatness equalization coefficient and the second non-flatness equalization coefficient of any one of the sub-carriers to obtain a non-flatness coefficient of the any one of the sub-carriers; and a second combination module configured to combine non-flatness coefficients of the plurality of sub-carriers to obtain the combined carrier non-flatness coefficient.

In some implementations, the first combining module is further configured to determine a non-flatness coefficient of an effective sub-carrier corresponding to the any one of the sub-carriers in the link through linear interpolation with a frequency point and/or temperature information of the any one of the sub-carriers in the link taken as an index, and combine the non-flatness coefficient of the effective sub-carrier and the first non-flatness equalization coefficient and the second non-flatness equalization coefficient of the any one of the sub-carriers to obtain the non-flatness coefficient of the any one of the sub-carriers in the frequency band.

In some implementations, the processing unit includes: a first processing module configured to obtain a combined carrier pre-equalization compensation coefficient and a combined carrier pre-equalization compensation factor according to the combined carrier non-flatness coefficient; and a second processing module configured to perform pre-equalization compensation on the link according to the combined carrier pre-equalization compensation coefficient and the combined carrier pre-equalization compensation factor.

In some implementations, the first processing module is further configured to subject the combined carrier non-flatness coefficient to normalization to obtain the combined carrier pre-equalization compensation coefficient and the combined carrier pre-equalization compensation factor.

In some implementations, the second processing module is further configured to perform frequency domain processing on each sub-carrier in the link according to the combined carrier pre-equalization compensation coefficient and the combined carrier pre-equalization compensation factor to perform equalization compensation on the link.

Figure 7:
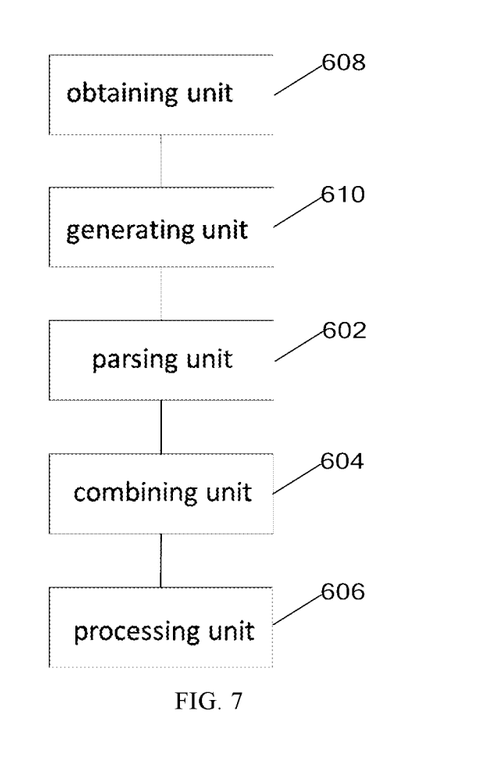
FIG. 7 is another block diagram of an exemplary pre-equalization compensation device for a link according to an embodiment of the present disclosure.

FIG. 7 is another block diagram of an exemplary pre-equalization compensation device for a link according to the embodiment of the present disclosure. As shown in FIG. 7, the device may further include: an obtaining unit 608 configured to obtain the first non-flatness equalization coefficients of the RF link with the plurality of sub-carriers by at least one of a signal source or a spectrometer, and obtain the second non-flatness equalization coefficients of the wave control link with the plurality of sub-carriers by at least one of a vector network analyzer or a scanner probe; and a generating unit 610 configured to generate the off-line compensation table according to the first non-flatness equalization coefficients and the second non-flatness equalization coefficients of the plurality of sub-carriers.

An embodiment of the present disclosure further provides a computer-readable storage medium having programs stored therein, and the programs, when executed by a process, implement the method described in the above embodiment.

In some implementations, the storage medium may be configured to store program codes used for performing the following operations:

S1, in response to that an AAU is powered on, parsing a prestored off-line compensation table to obtain first non-flatness equalization coefficients of an RF link with a plurality of sub-carriers and second non-flatness equalization coefficients of a wave control link with the plurality of sub-carriers, with each one of the plurality of sub-carriers corresponding to one of the first non-flatness equalization coefficients and one of the second non-flatness equalization coefficients;

S2, combining the first non-flatness equalization coefficients of the plurality of sub-carriers and the second non-flatness equalization coefficients of the plurality of sub-carriers to obtain a combined carrier non-flatness coefficient; and S3, performing equalization compensation on the link according to the combined carrier non-flatness coefficient, with the equalization compensation used for improving signal flatness in the whole link.

In some implementations, the storage medium may include, but is not limited to, various medium capable of storing program codes, such as a USB flash disk, an ROM, an RAM, a mobile hard disk, a magnetic disk and an optical disc.

An embodiment of the present disclosure further provides an electronic device, including a memory having computer programs stored therein, and a processor configured to run the computer programs to perform the method described in the above embodiment.

In some implementations, the electronic device may further include a transmission device connected to the processor, and an input/output device connected to the processor.

In some implementations, the processor may be configured to run the computer programs to perform the following operations:

S1, in response to that an AAU is powered on, parsing a prestored off-line compensation table to obtain first non-flatness equalization coefficients of an RF link with a plurality of sub-carriers and second non-flatness equalization coefficients of a wave control link with the plurality of sub-carriers, with each one of the plurality of sub-carriers corresponding to one of the first non-flatness equalization coefficients and one of the second non-flatness equalization coefficients;

S2, combining the first non-flatness equalization coefficients of the plurality of sub-carriers and the second non-flatness equalization coefficients of the plurality of sub-carriers to obtain a combined carrier non-flatness coefficient; and S3, performing equalization compensation on the link according to the combined carrier non-flatness coefficient, with the equalization compensation used for improving signal flatness in the whole link.

In some implementations, reference may be made to the examples described in the above embodiment and exemplary implementations for specific examples of the embodiment, and thus the specific examples of the embodiment are not described in detail here.

Apparently, it should be understood by those of ordinary skill in the art that all the modules or operations of the present disclosure described above may be implemented by a general-purpose computing device, may be integrated in a single computing device or distributed on a network composed of a plurality of computing devices. In some implementations, the modules or operations may be implemented by program codes executable by a computing device, such that the modules or operations can be stored in a storage device and executed by a computing device. In some cases, the operations illustrated or described may be performed in an order different from that described herein. The modules or operations may be separately made into integrated circuit modules, or some of the modules or operations may be made into a single integrated circuit module. Thus, the present disclosure is not limited to any specific combination of hardware and software.

The description above is merely of the exemplary embodiments of the present disclosure, but is not intended to limit the present disclosure. Various modifications and changes may be made to the present disclosure by those of ordinary skill in the art. Any modification, equivalent replacement and improvement made within the principle of the present disclosure should be considered to be within the protection scope of the present disclosure.

What is claimed is:

1. A pre-equalization compensation method for a link, comprising:
   in response to that an Active Antenna Unit (AAU) is powered on, parsing a prestored off-line compensation table to obtain first non-flatness equalization coefficients of a Radio Frequency (RF) link with a plurality of sub-carriers and second non-flatness equalization coefficients of a wave control link with the plurality of sub-carriers, wherein each one of the plurality of sub-carriers is corresponding to one of the first non-flatness equalization coefficients and one of the second non-flatness equalization coefficients;
   combining the first non-flatness equalization coefficients of the plurality of sub-carriers and the second non-flatness equalization coefficients of the plurality of sub-carriers to obtain a combined carrier non-flatness coefficient; and
   performing equalization compensation on the link according to the combined carrier non-flatness coefficient, wherein the equalization compensation is used for improving signal flatness in the whole link;
   wherein the first non-flatness equalization coefficients of the Radio Frequency (RF) link comprise flatness characteristic parameters of a downlink data link, the second non-flatness equalization coefficients of a wave control link comprise flatness characteristic parameters of an antenna panel.

2. The method of claim 1, wherein the combining the first non-flatness equalization coefficients of the plurality of sub-carriers and the second non-flatness equalization coefficients of the plurality of sub-carriers to obtain a combined carrier non-flatness coefficient comprises:
   combining the first non-flatness equalization coefficient and the second non-flatness equalization coefficient of any one of the sub-carriers to obtain a non-flatness coefficient of the any one of the sub-carriers; and combining non-flatness coefficients of the plurality of sub-carriers to obtain the combined carrier non-flatness coefficient.

3. The method of claim 2, wherein the combining the first non-flatness equalization coefficient and the second non-flatness equalization coefficient of any one of the sub-carriers to obtain a non-flatness coefficient of the any one of the sub-carriers comprises:

determining a non-flatness coefficient of an effective sub-carrier corresponding to the any one of the sub-carriers in the link through linear interpolation with a frequency point and/or temperature information of the any one of the sub-carriers in the link taken as an index; and combining the non-flatness coefficient of the effective sub-carrier and the first non-flatness equalization coefficient and the second non-flatness equalization coefficient of the any one of the sub-carriers to obtain the non-flatness coefficient of the any one of the sub-carriers in a frequency band.

4. The method of claim 1, wherein the performing equalization compensation on the link according to the combined carrier non-flatness coefficient comprises:

obtaining a combined carrier pre-equalization compensation coefficient and a combined carrier pre-equalization compensation factor according to the combined carrier non-flatness coefficient; and performing pre-equalization compensation on the link according to the combined carrier pre-equalization compensation coefficient and the combined carrier pre-equalization compensation factor.

5. The method of claim 4, wherein the obtaining a combined carrier pre-equalization compensation coefficient and a combined carrier pre-equalization compensation factor according to the combined carrier non-flatness coefficient comprises:

subjecting the combined carrier non-flatness coefficient to normalization to obtain the combined carrier pre-equalization compensation coefficient and the combined carrier pre-equalization compensation factor.

6. The method of claim 4, wherein the performing pre-equalization compensation on the link according to the combined carrier pre-equalization compensation coefficient and the combined carrier pre-equalization compensation factor comprises:

performing frequency domain processing in the plurality of sub-carriers in the link according to the combined carrier pre-equalization compensation coefficient and the combined carrier pre-equalization compensation factor to perform equalization compensation on the link.

7. The method of claim 1, before the parsing a prestored off-line compensation table to obtain first non-flatness equalization coefficients of a RF link with a plurality of sub-carriers and second non-flatness equalization coefficients of a wave control link with the plurality of sub-carriers, further comprising:

obtaining the first non-flatness equalization coefficients of the RF link with the plurality of sub-carriers by at least one of a signal source or a spectrometer, and obtaining the second non-flatness equalization coefficients of the wave control link with the plurality of sub-carriers by at least one of a vector network analyzer or a scanner probe; and generating the off-line compensation table according to the first non-flatness equalization coefficients and the second non-flatness equalization coefficients of the plurality of sub-carriers.

8. A pre-equalization compensation device for a link, comprising:

a parsing unit configured to, in response to that an AAU is powered on, parse a prestored off-line compensation table to obtain first non-flatness equalization coefficients of an RF link with a plurality of sub-carriers and second non-flatness equalization coefficients of a wave control link with the plurality of sub-carriers, wherein each one of the plurality of sub-carriers is corresponding to one of the first non-flatness equalization coefficients and one of the second non-flatness equalization coefficients;

a combining unit configured to combine the first non-flatness equalization coefficients of the plurality of sub-carriers and the second non-flatness equalization coefficients of the plurality of sub-carriers to obtain a combined carrier non-flatness coefficient; and a processing unit configured to perform equalization compensation on the link according to the combined carrier non-flatness coefficient, wherein the equalization compensation is used for improving signal flatness in the whole link, wherein the first non-flatness equalization coefficients of the Radio Frequency (RF) link comprise flatness characteristic parameters of a downlink data link, the second non-flatness equalization coefficients of a wave control link comprise flatness characteristic parameters of an antenna panel.

9. A non-transitory computer-readable storage medium having programs stored therein, the computer programs, when executed by a processor, perform the method of claim 1.

10. An electronic device, comprising a memory having computer programs stored therein, and a processor configured to run the computer programs to perform the method of claim 1.

11. The method of claim 2, wherein the performing equalization compensation on the link according to the combined carrier non-flatness coefficient comprises:

obtaining a combined carrier pre-equalization compensation coefficient and a combined carrier pre-equalization compensation factor according to the combined carrier non-flatness coefficient; and performing pre-equalization compensation on the link according to the combined carrier pre-equalization compensation coefficient and the combined carrier pre-equalization compensation factor.

12. The method of claim 11, wherein the obtaining a combined carrier pre-equalization compensation coefficient and a combined carrier pre-equalization compensation factor according to the combined carrier non-flatness coefficient comprises:

subjecting the combined carrier non-flatness coefficient to normalization to obtain the combined carrier pre-equalization compensation coefficient and the combined carrier pre-equalization compensation factor.

13. The method of claim 11, wherein the performing pre-equalization compensation on the link according to the combined carrier pre-equalization compensation coefficient and the combined carrier pre-equalization compensation factor comprises:

performing frequency domain processing in the plurality of sub-carriers in the link according to the combined carrier pre-equalization compensation coefficient and the combined carrier pre-equalization compensation factor to perform equalization compensation on the link.

* * * * *